United States Patent [19]

Sawada et al.

[11] 3,745,837

[45] July 17, 1973

[54] SUPPORT DEVICE FOR A TUNER ACTUATOR

[75] Inventors: Akihisa Sawada; Katsuzo Fujimori, both of Tokyo, Japan

[73] Assignee: Alps Electric Co., Ltd., Tokyo, Japan

[22] Filed: Nov. 24, 1971

[21] Appl. No.: 201,653

[30] Foreign Application Priority Data

Dec. 29, 1970 Japan ............................ 45/138065

[52] U.S. Cl. ................................ 74/10.39, 308/4 R

[51] Int. Cl. ........................................ F16h 35/18

[58] Field of Search .................... 74/10.39, 10.6, 10; 308/4 R

[56] References Cited

UNITED STATES PATENTS 2,102,325 12/1937 Kylstra ............................ 308/4 R X 2,950,149 8/1960 Thomson ............................ 308/4 R 3,675,496 7/1972 Yasuda et al. ........................ 74/10.6

*Primary Examiner*—Milton Kaufman

*Attorney*—Maxwell James et al.

[57] ABSTRACT

A tuner has a slidable actuator that upon movement varies the electrical value of a component. The actuator has at each of its ends at least one arm extending therefrom. A pair of hollow tubular sleeves having smooth outer surfaces are disposed on said arms respectively and are received in a pair of guides so that the actuator can smoothly slide with a high degree of accuracy. Preferably, the sleeves are seamless and are made of brass.

9 Claims, 3 Drawing Figures

SUPPORT DEVICE FOR A TUNER ACTUATOR

BACKGROUND OF THE INVENTION

The present invention relates to tuners and more particularly to tuners having sliding actuators which affect television channel selection.

Tuners are a common component of electronic circuits which are used to receive desired frequencies. The tuner is connected to receive signals from an antenna and to select or tune to a signal having a particular frequency. To accomplish this, tuners have at least one tunable circuit, which usually comprises a capacitor and an inductor which can resonate at the desired frequency in accordance with their values of capacitance and inductance respectively. Since it is usually desired to tune to one of several frequencies, one of these elements must be made variable so as to enable the tuned circuit to select a particular frequency. Often the capacitor is the variable element. A variable capacitor usually has a rotating shaft which, when rotated, changes the position of one set of capacitor plates with respect to another, thereby changing the value of the capacitance. A typical arrangement has a pinion gear disposed at one end of the rotating shaft and rack teeth on the actuator that engage the pinion gear. By sliding the actuator back and forth, the value of the capacitor, and hence the frequency to which the tuned circuit is tuned, can be changed.

In a typical television tuner, where the desired frequencies correspond to the frequencies of various discrete television channels, it is usual to have several adjustable elements disposed about a second rotating shaft in preset positions so that each of the elements can successively engage a cam on the actuator and move the actuator to different positions when the second shaft is rotated. These positions set the capacitor to the correct capacitance values so that the tuner can tune to the respective channels. To enable the actuator to reciprocate, it has arms at its ends that are slidably received by rectangular slots in a frame of the tuner.

A problem arises with such an arrangement because the slots are usually formed by punching, which results in their having very irregular inner surfaces. This in turn results in a very rough sliding action of the actuator in the slots. The prior art has attempted to overcome this problem by using such techniques as butt joining or the insertion of an adjusting plate into the rectangular slots so as to achieve a better, smoother fit. This is obviously an expensive process because of cost of the materials and the labor involved in adjusting the plate. Even then, such a prior art device can result in an erratic operation of the actuator that may affect the resettability of the tuner to a particular channel. Also, the adjusting plate can work loose, and therefore may have to be periodically reset.

It is therefore an object of the present invention to provide an actuator support means that will allow the actuator to smoothly slide back and forth.

It is another object of the present invention to provide an actuator support means that does not require periodic readjustment.

It is a further object of the present invention to provide an actuator support means that is inexpensive to manufacture and assemble.

SUMMARY

In brief, these and other objects are achieved by using in conjunction with an actuator that engages a member of an electrical component to vary an electrical value thereof and which has at least one arm disposed at each of its ends, a pair of hollow sleeves having smooth outer surfaces disposed on each of the arms. On the support frames a pair of guides have circular holes to receive each of the sleeves so that the outer surfaces of the sleeves smoothly engage the inner surfaces of the guide holes respectively. Therefore the actuator can reciprocate smoothly and the electrical value of the component can be correspondingly smoothly changed with a high degree of resettability.

Preferably the sleeves are seamless to improve the smoothness of the sliding action. They can be soldered to the arms so as to achieve an inexpensive mounting method. The frame holes can be formed by punching and thereafter finished with a reamer to have a very smooth inner surface to receive the sleeves.

To the accomplishment of the above, and to such other objects as may hereinafter appear, the present invention relates to a support means for an actuator as defined in the appended claims and as described in this specification, taken in conjunction with the drawings in which:

Figure 1:
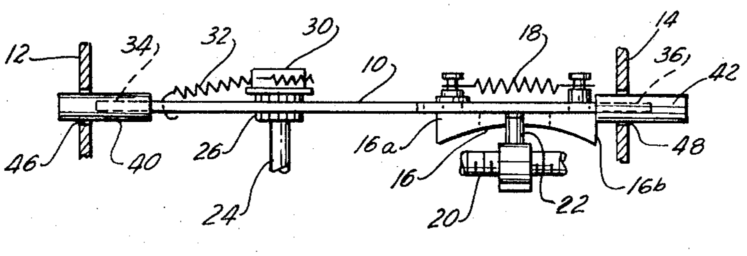
FIG. 1 is a top plan view of an actuator in accordance with the present invention and some of its associated components within the tuner.
Figure 3:
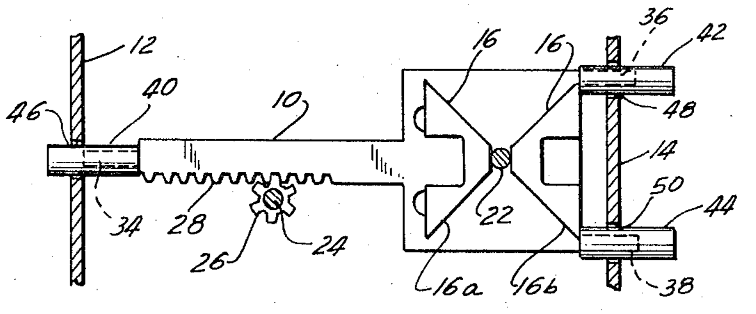
FIG. 3 is a side view of the actuator with its sleeves disposed on it and within its guides.

FIGS. 1 and 3 show that in general an actuator 10 rectangular in cross section is slidably received in a pair of guides 12 and 14 by a means that will be described in detail below. Guides 12 and 14 are a part of the frame of the entire tuner and are therefore integral with each other. Mounted near one end of the actuator 10 is a cam 16 that has two sections, 16*a* and 16*b*. Section 16*a* is fixedly mounted on actuator 10, typically by soldering, while section 16*b* is slidably received by slots (not shown) in the actuator 10. A spring 18 is connected at each of its ends to said sections 16*a* and 16*b* and draws them together. As can best be seen in FIG. 3, cam 16 has an "X" shape, when viewed in plan. A drum (not shown) has a plurality of shafts disposed near its outer circumference. One of these shafts 20 is shown in FIG. 1. A memory element 22 is disposed on the shaft 20 in a preselected position and is adapted to engage the cam 16. A capacitor (not shown) has a shaft 24 that has a pinion gear 26 fastened thereon. As best shown in FIG. 3, the actuator 10 has a rack 28 that engages the pinion 26. Therefore as the actuator 10 laterally reciprocates, the shaft 24 will turn. The very end of the shaft 24 has disposed thereon a smooth gear 30 which in turn has disposed thereabout an antibacklash spring 32 that is connected at its other end to the actuator 10. This spring prevents play or backlash between the actuator 10 and the capacitor shaft 24.

In operation, each of the memory elements 22 are first set to a position on their respective threaded shafts 20 so that the tuner will tune to different channels when different slugs engage cam 16. The drum is rotated by a channel selection knob (not shown) so that a particular element 22 would be brought into engagement with the cam 16. This will move the actuator 10 laterally as viewed in FIG. 1 so that it slides in its guides 12 and 14. This in turn will rotate the shaft 24 through the rack 28 and pinion 26 to a desired position so that the capacitor is set to the proper value of capacitance, for the circuit to be tuned to the selected channel.

Figure 2:
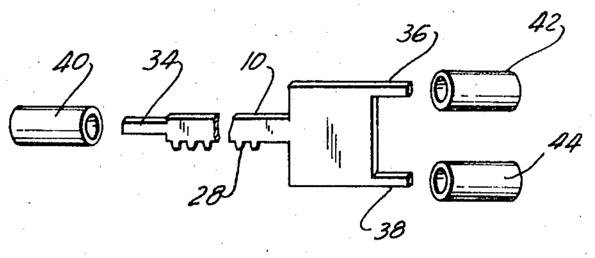
FIG. 2 is an exploded perspective view of the actuator and its sleeves.

FIG. 2 shows some of the details of the guide means of the present invention. There it will be seen that the actuator 10 has an arm 34 at its left end and a pair of arms 36 and 38 at its right end. Two arms 36 and 38 are used at the right end since that is the end that has the cam 16 mounted near it, and therefore that end has the most force applied to it, particularly in a direction other than longitudinally. Hollow brass seamless sleeves 40, 42 and 44 each have a smooth outer surface and are disposed by soldering on the arms 34, 36 and 38 respectively, as best shown in FIG. 3. Guide 12 has a circular hole 46 for receiving the sleeve 40, while guide 14 has circular holes 48 and 50 for receiving the sleeves 42 and 44. These holes 46, 48 and 50 are formed by punching and are then finished with a reamer so as to have a smooth inner surface.

It will readily be appreciated that because of the smooth outer surfaces of the sleeves and the smooth inner surfaces of the holes that receive them, the actuator 10 can easily reciprocate to accomplish the channel selection operation. The guide receiving holes 46, 48, 50 are easily formed in inexpensive manner, and because they are formed accurately, no plate adjustment is needed in the present invention. Because of the smooth operation, the resettability of the tuner to a particular channel is greatly improved and a long operational lifetime is achieved.

Although the present invention has been disclosed with respect to but a single embodiment, it is to be understood that many variations may be made therein, all without departing from the spirit and scope of the invention as defined in the following claims.

We claim:

1. In a tuner having a base, a component mounted on said base with a movable member adapted upon movement thereof to vary an electrical value of said component, a movable body engaging said member and adapted to transmit movement of said body to said member, whereby said electrical value can be controlled by movements of said body, the improvement comprising said body having at least one arm of non-circular cross section at each of its ends, a pair of hollow tubular sleeves of substantially circular cross section each having smooth outer surface, said sleeves having their inner surfaces affixed to said arms respectively, and a pair of guides mounted on said base each having a smooth circular hole adapted to slidably receive said outer surfaces of said sleeves respectively, whereby said body can move to control the electrical value of said component with a high degree of accuracy.

2. A tuner in accordance with claim 1, wherein said body further comprises a third arm disposed at one of said ends thereof, a third hollow tubular sleeve having a smooth outer surface and an inner surface affixed to said third arm, and a third guide having a third smooth circular hole adapted to receive said outer surface of said third sleeve.

3. A tuner in accordance with claim 2, wherein said third guide and one of said other guides are integral.

4. A tuner in accordance with claim 1, wherein each of said sleeves is seamless.

5. A tuner in accordance with claim 1, wherein each of said sleeves is made from brass.

6. A tuner in accordance with claim 1, wherein said member comprises a variable capacitor having a shaft comprising said member.

7. A tuner in accordance with claim 1, wherein said body comprises a slider having a rack portion, said member having a pinion portion engaging said rack portion.

8. A tuner in accordance with claim 1, further comprising means for moving said body into a plurality of preselected positions.

9. A tuner in accordance with claim 1, wherein said sleeves are soldered to said arms.

* * * * *